(12) United States Patent
Gavrilenco et al.

(10) Patent No.: US 9,179,190 B2
(45) Date of Patent: *Nov. 3, 2015

(54) APPARATUS, METHOD, AND SYSTEM FOR DIGITAL CONTENT AND ACCESS PROTECTION

(71) Applicants: Colin Gavrilenco, Montreal (CA); Mathieu Therien, Saint-Lambert (CA)

(72) Inventors: Colin Gavrilenco, Montreal (CA); Mathieu Therien, Saint-Lambert (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,297

(22) Filed: Jan. 15, 2015

(65) Prior Publication Data

US 2015/0125132 A1    May 7, 2015

Related U.S. Application Data

(63) Continuation of application No. 13/061,906, filed as application No. PCT/CA2009/001210 on Sep. 3, 2009, now Pat. No. 8,964,972.

(60) Provisional application No. 61/093,924, filed on Sep. 3, 2008.

(51) Int. Cl.
*H04L 9/00* (2006.01)
*H04N 21/4627* (2011.01)
*G06F 21/10* (2013.01)
*G10L 19/018* (2013.01)
*G11B 20/10* (2006.01)
*H04N 21/44* (2011.01)

(52) U.S. Cl.
CPC ............ *H04N 21/4627* (2013.01); *G06F 21/10* (2013.01); *G10L 19/018* (2013.01); *G11B 20/10037* (2013.01); *H04N 21/44* (2013.01)

(58) Field of Classification Search
CPC .. G06F 21/10; G11B 20/10037; G10L 19/018
See application file for complete search history.

(56) References Cited

U.S. PATENT DOCUMENTS 4,825,451 A * 4/1989 Schwartz ...................... 375/246
7,750,829 B2 * 7/2010 Kim et al. ....................... 341/67

* cited by examiner

*Primary Examiner* — Jeffrey Pwu
*Assistant Examiner* — Helai Salehi
(74) *Attorney, Agent, or Firm* — Norton Rose Fulbright Canada LLP (57) ABSTRACT

There is described a method for providing a video signal to a user, comprising: sampling said video signal at a user specific sampling rate, thereby obtaining temporally organized sample amplitudes; removing a time interrelation between said temporally organized sample amplitudes, thereby obtaining sample amplitudes having no time interrelation; transmitting said sample amplitudes having no time interrelation to said user; and reconstructing said video signal by inserting a user-specific sampling interval between successive ones of said sample amplitudes, said user-specific sampling interval corresponding to said user-specific sampling rate.

16 Claims, 9 Drawing Sheets

APPARATUS, METHOD, AND SYSTEM FOR DIGITAL CONTENT AND ACCESS PROTECTION

CROSS-REFERENCE TO RELATED APPLICATIONS

The present application is a continuation of U.S. application Ser. No. 13/061,906, filed on Sep. 3, 2009, which claims priority under 35 USC§119(e) of U.S. Provisional patent application bearing Ser. No. 61/093,924, filed on Sep. 3, 2008, the contents of which are hereby incorporated by reference.

TECHNICAL FIELD

The present invention relates to the field of content access and protection.

BACKGROUND

Electronic piracy includes infringement, illegal copying, and distribution of electronic intellectual property. Music, videos, films, books, etc are vulnerable to electronic piracy. The Internet is one of the favourite tools for pirates. Because of its capacity to store and transfer large volumes of data, the Internet has allowed the illicit copying and dissemination of electronic multimedia content.

Therefore, there is a need for a method of protecting electronic multimedia data in order to reduce or eliminate piracy.

SUMMARY

In accordance with a first broad aspect, there is provided a method for providing a video signal to a user, comprising: sampling said video signal at a user specific sampling rate, thereby obtaining temporally organized sample amplitudes; removing a time interrelation between said temporally organized sample amplitudes, thereby obtaining sample amplitudes having no time interrelation; transmitting said sample amplitudes having no time interrelation to said user; and reconstructing said video signal by inserting a user-specific sampling interval between successive ones of said sample amplitudes, said user-specific sampling interval corresponding to said user-specific sampling rate.

In accordance with another broad aspect, there is provided a system for transferring a video signal to a user, comprising a first machine comprising a first memory, a first processor and first communication means, said first processor being adapted for sampling said video signal at a user specific sampling rate in order to obtain temporally organized sample amplitudes and to remove a time interrelation between said temporally organized sample amplitudes in order to obtain sample amplitudes having no time interrelation; and a second machine comprising a second memory for storing a user-specific sampling interval, a second processor and second communication means and being in communication with said first machine, said second processor being adapted for reconstructing said video signal by inserting said user-specific sampling interval between successive ones of said sample amplitudes having no time interrelation, said user-specific sampling interval corresponding to said user-specific sampling rate.

In accordance with another broad aspect, there is provided a method for downloading a video signal, comprising: receiving a non-identical copy of said video signal, said non-identical copy comprising sample amplitudes having no time interrelation resulting from a sampling of said video signal using a user specific sampling rate, thereby obtaining the sample amplitudes, and from a removal of the time interrelation between said sample amplitudes; and reconstructing said video signal by inserting a user-specific sampling interval between successive ones of said sample amplitudes, said user-specific sampling interval corresponding to said user-specific sampling rate.

In accordance with a further broad aspect, there is provided a digital video player comprising communication means adapted to receive a non-identical copy of a video signal comprising sample amplitudes having no time interrelation resulting from a sampling of said video signal using a user specific sampling rate, thereby obtaining the sample amplitudes, and from a removal of the time interrelation between said sample amplitudes; a memory for storing a user-specific sampling interval corresponding to said user-specific sampling rate; a reconstruction module adapted to reconstruct a digital reconstructed copy of said video signal by inserting said user-specific sampling interval between successive ones of said sample amplitudes; and a digital-to-analog converter adapted to convert said digital reconstructed copy in an analog video signal.

In accordance with another broad aspect, there is provided a method for providing an audio signal to a user-end, comprising: modifying an amplitude of at least some samples of the audio signal using at least one user-specific series of samples, thereby obtaining a non-identical copy of the audio signal; transmitting the non-identical copy to the user-end; at the user-end, identifying the at least some samples within the non-identical copy; and restoring the amplitude of the at least some samples using the at least one user-specific series of samples, thereby reconstructing the audio signal.

In accordance with another broad aspect, there is provided a system for transferring a copy of an audio signal to a user, comprising: a first machine comprising a first memory, a first processor and first communication means, the first processor being adapted to modify an amplitude of at least some samples of the audio signal using at least one user-specific series of samples in order to obtain a non-identical copy of the audio signal; and a second machine comprising a second memory for storing the at least one user-specific series of samples, a second processor and second communication means and being in communication with the first machine, the second processor being adapted to identify the at least some samples within the non-identical copy and to restore the amplitude of the at least some samples using the at least one user-specific series of samples in order to reconstruct the audio signal.

In accordance with another broad aspect, there is provided a method for downloading an audio signal, comprising: receiving a non-identical copy of the audio signal, the non-identical copy comprising a series of audio signal samples having an amplitude of at least some samples modified using at least one user-specific series of samples; identifying the at least some samples within the non-identical copy; and restoring the amplitude of the at least some samples using the at least one user-specific series of samples, thereby reconstructing the audio signal.

In accordance with another broad aspect, there is provided a digital audio player comprising: communication means adapted to receive a non-identical copy of the audio signal, the non-identical copy comprising a series of audio signal samples having an amplitude of at least some samples modified using at least one user-specific series of samples; a memory for storing the at least one user-specific series of samples; a reconstruction module adapted to reconstruct the audio signal by identifying the at least some samples within the non-identical copy and restoring the amplitude of the at least some samples using the at least one user-specific series of samples; and a digital-to-analog converter adapted to convert the audio signal in an analog signal.

The term "master data" refers to data of which a copy is generated and sent to a user. Master data can be any type of data such as text, an audio signal, a video signal, and the like. For example, a master audio signal may be any type of audio signal such as a song, a movie soundtrack, and the like. The master audio signal can be an analog or digital audio signal. A master audio signal can comprise several audio channels. In the case of a song, the master audio file is called a master song.

The term "identical copy" refers to a substantially identical digital copy of the master data. In the case of a master text, the identical copy is an identical copy of the master text. In the case of a master audio or video signal, an identical copy of the master signal is a signal which reproduces the master audio or video signal after being converted into an analog signal. When an identical copy of an audio or video signal is played back, the rendered sound or video corresponds to the sound or video rendered when the master audio or video signal is played back.

In the case of a master audio or video signal, the term "non-identical copy" refers to a digital copy of a master audio or video signal that does not render the same sound or video as the master audio or video signal when it is played back. In the case of a master text, the non-identical copy of the master text is different from the master text.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
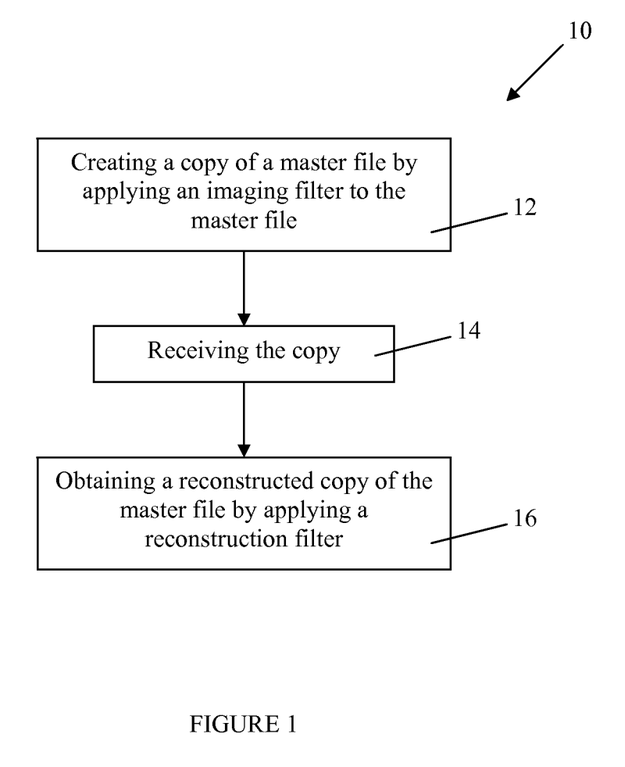
FIG. 1 is a flow chart of a method for transmitting a copy of an audio signal to a user, in accordance with an embodiment.

FIG. 1 illustrates one embodiment of a method 10 for transferring a copy of a master data. For example, the master data can be a master audio file such as a song. The user who wants to purchase a song, for example, connects to a server of a song retailer via a network such as the Internet, a local area network (LAN), a metropolitan area network (MAN), and the like. The first step of the method 10 is the creation of an image of the master song selected by the user 12. The image of the master song is created by applying an imaging filter to the master song. The image is a digital non-identical copy of the master song. Information may be missing or altered in the image with respect to the master song. Alternatively, additional information may be added in the image with respect to the master song. As a result, if the image is executed on the user's side, the song is not properly rendered. The imaging filter is user-specific so that two different users have different imaging filters leading to different images of the same master song. As a result, the created image of the master song can only be properly read by the user for which it has been created.

The image of the master song is then sent to the user 14. The last step of the method 10 is the creation of a reconstructed copy of the master song 16. The reconstructed copy is obtained by applying a reconstruction filter to the image copy and is an identical digital copy of the master song. During the reconstruction step, the missing information is added to the image in order to obtain the reconstructed copy. Alternatively, the additional information that has been added during the imaging process is suppressed from the image to obtain an identical copy of the master song. The reconstructed copy of the song is finally converted into an analog signal to be listened to by the user.

In one embodiment, the method 10 is used in a pay-per-audition system and the received image of the master song is reconstructed without being stored.

In another embodiment, the method 10 is used in a pay-per-song system, the image copy of the master song is stored on the user's side. Each time the user wants to playback the song, the image copy is reconstructed before being converted into an analog signal.

The set of imaging and reconstruction filters is unique for each user. A particular imaging filter is used to create an image of a master song for a user A and only user A can playback the song since he is provided with a reconstruction filter corresponding to the particular imaging filter. If user B receives user A's image, its reconstruction filter is not adapted to properly reconstruct the master song. As a result, when player B plays back the reconstructed copy based on the image of user A, the resulting sound does not correspond to the initial master song.

While the description refers to the transfer of a copy of a master audio file to a user, it should be understood that the method 10 can be used for transferring any type of master data. For example, the master data can be a text or video signal. At step 12, a user-specific imaging filter is applied to the master data in order to obtain a non-identical copy of the master data. The non-identical copy of the master data is sent to the user at step 14 and an identical copy of the master data is then reconstructed at the user-end by applying a reconstruction filter to the received non-identical copy of the master data, at step 16.

Figure 2A:
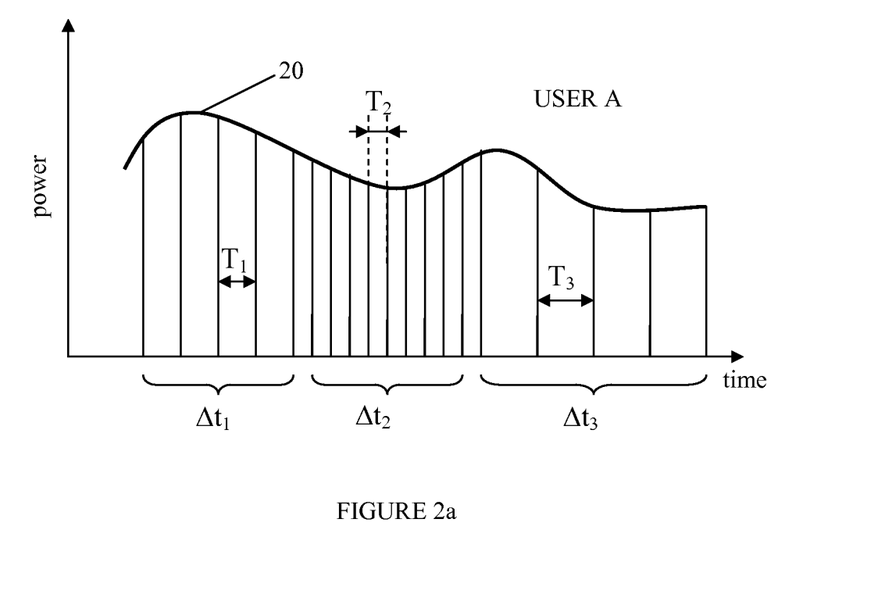
FIG. 2a illustrates a master audio signal and the imaging process for a first user, in accordance with an embodiment.
Figure 2B:
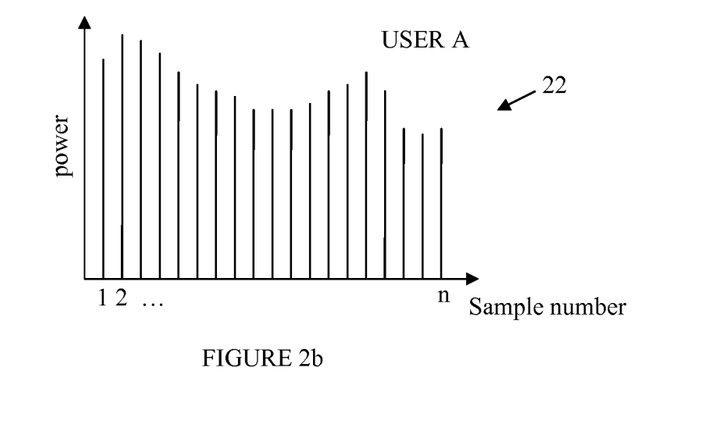
FIG. 2b illustrates the image signal resulting from the imaging process of FIG. 2a, in accordance with an embodiment.

In one embodiment where the master data comprises a master audio file, the step of applying an imaging filter comprises sampling the master song, and the imaging filter applies a sampling function to a copy of the master audio file. The imaging sampling function used for the sampling of the master song has a time-varying sampling rate (SR) or frequency. The sampling rate defines the number of samples per second taken from the audio signal of the master song. FIG. 2a illustrates an embodiment of the sampling process for a first user, namely user A. The audio signal 20 of the master song is represented as a function of time. The audio signal 20 is divided into several time intervals $\Delta t_1$, $\Delta t_2$, and $\Delta t_3$. The sampling rate applied by the sampling function varies in time and is dependent on the time intervals. The sampling rates SR1, SR2, and SR3 are applied within the time intervals $\Delta t_1$, $\Delta t_2$, and $\Delta t_3$, respectively. As result, three series of sample amplitudes are generated. Successive sample amplitudes of the first, second, and third series are temporally spaced apart by a sampling interval $T_1$, $T_2$, and $T_3$, respectively. The next step consists in removing the temporal relation between successive sample amplitudes in each of the three series of sample amplitudes in order to obtain a non-identical copy of the master song. FIG. 2b illustrates the resulting image 22 of the master song signal for user A. The image is a series of samples of different amplitude and having no time interrelation or organization. The image is just a series of numbers corresponding to the amplitude of the sampling points. It should be understood that the expression "no time interrelation" may also mean that the samples of the image 22 can be equally spaced in time.

While the audio signal 20 is split into three segments corresponding to the three time intervals $\Delta t_1$, $\Delta t_2$, and $\Delta t_3$, it should be understood that the number of segments may be lower or greater as long as the audio signal 20 is divided into at least two segments corresponding to two time intervals. It should also be understood that the sampling function applies a different sampling rate to at least two segments of the audio signal 20.

In one embodiment, the time intervals $\Delta t_1$, $\Delta t_2$, and $\Delta t_3$ have a constant duration. Alternatively, they can have varying durations. For example, $\Delta t_1$ and $\Delta t_2$ may have the same duration while $\Delta t_3$ may be longer than $\Delta t_1$ and $\Delta t_2$. The combination of a particular sampling rate with a time interval duration defines a number of sampling points n. For example, the association of the time interval $\Delta t_1$ with its corresponding sampling rate SR1 defines five sampling points n, while the association of the time interval $\Delta t_3$ with its corresponding sampling rate SR3 defines four sampling points n. The imaging filter can be represented as: $\{\Delta t_1, SR1\}$, $\{\Delta t_2, SR2\}$, $\{\Delta t_3, SR3\}$. Alternatively, the imaging filter can be represented by pairs of sampling points and sampling rates $\{n_1, SR1\}$, $\{n_2, SR2\}$, $\{n_3, SR3\}$, respectively. If the duration of the time intervals is constant, then the imaging filter can be represented as: SR1, SR2, SR3.

Figure 2C:
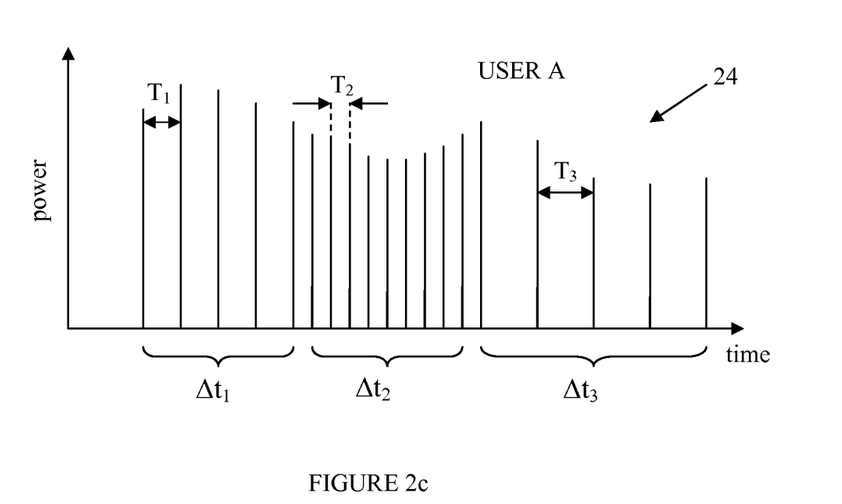
FIG. 2c illustrates the reconstruction process of the image signal of FIG. 2b, in accordance with an embodiment.
Figure 2D:
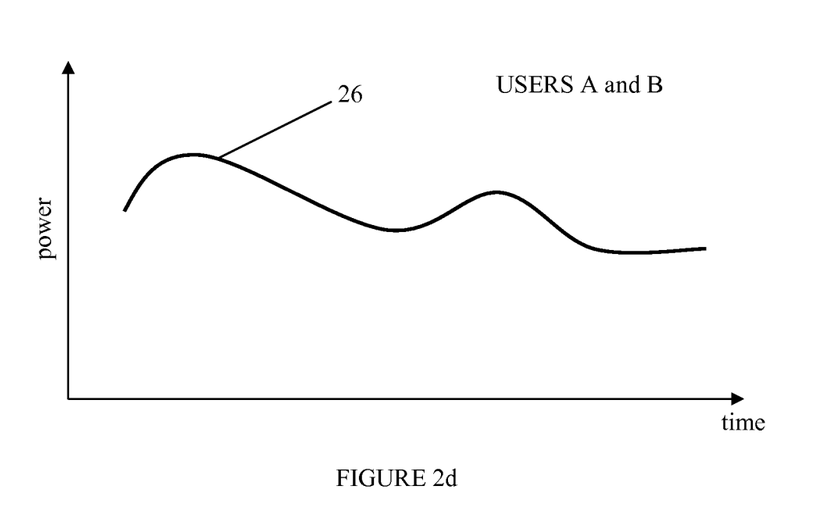
FIG. 2d illustrates an analog signal generated from the reconstructed signal of FIG. 2c, in accordance with an embodiment.

The image 22 is then sent to user A which is provided with an appropriate reconstruction filter. The reconstruction filter is represented by a series of sampling intervals $T_1$, $T_2$, and $T_3$ associated with a corresponding sampling point number n1, n2, and n3, or with a corresponding time interval $\Delta t_1$, $\Delta t_2$, and $\Delta t_3$. Referring to the previous example, the reconstruction filter corresponding to the imaging filter used to create the image 22 can be represented by the following pairs of sampling rates and sampling point numbers: $\{T_1, n1\}$, $\{T_2, n2\}$, $\{T_3, n3\}$. The sampling intervals $T_1$, $T_2$, and $T_3$ correspond to the sampling rates SR1, SR2, and SR3 used in the imaging process. For example, $T1=1/SR1$. The sampling interval $T_1$ is applied to the first n1 points of the received image 22, the sampling interval $T_2$ is applied to the points (n1+1) to (n1+n2) of the image 22, and the sampling interval $T_3$ is applied to the points (n1+n2+1) to (n1+n2+n3). Alternatively, the reconstruction filter is represented by the following pairs of sampling intervals and time intervals: $\{T_1, \Delta t_1\}$, $\{T_2, \Delta t_2\}$, $\{T_3, \Delta t_3\}$. The sample numbers n1, n2, and n3 are then determined using the sampling intervals $T_1$, $T_2$, and $T_3$ and their corresponding time intervals $\Delta t_1$, $\Delta t_2$, and $\Delta t_3$. For example, $n1=abs(\Delta t_1/T_1)$. By inserting the appropriate sampling interval $T_1$, $T_2$, $T_3$ between successive samples of the received image, a reconstructed copy 24 of the master song signal is obtained as illustrated in FIG. 2c. The reconstructed copy is a substantially identical copy of the master song. The reconstructed signal 24 is then converted into an analog signal 26 in order to play back the song. It should be understood that any method known to a person skilled in the art to convert a digital signal into an analog signal may be used.

In one embodiment, the sample numbers n1, n2, and n3 and/or the time intervals $\Delta t_1$, $\Delta t_2$, and $\Delta t_3$ are predetermined. In this case, only the temporally unrelated or unorganized samples of the image 22 are sent to the user.

In another embodiment, the sample numbers n1, n2, and n3 and/or the time intervals $\Delta t_1$, $\Delta t_2$, and $\Delta t_3$ are determined during the generation of the image 22. In this case, the sample numbers n1, n2, and n3 or the time intervals $\Delta t_1$, $\Delta t_2$, and $\Delta t_3$ are sent to the user in addition to the image 22.

In one embodiment, the pairs $\{\Delta t_1, SR1\}$, $\{\Delta t_2, SR2\}$, and $\{\Delta t_3, SR3\}$ of the imaging filter are chosen so that the number of sampling points per time interval is constant: n1=n2=n3. In this case, the reconstruction filter can be represented by the constant number of sampling points and the series of sampling intervals: n1, $T_1$, $T_2$, $T_3$.

In another embodiment, the pairs $\{n_1, SR1\}$, $\{n_2, SR2\}$, and $\{n_3, SR3\}$ are chosen so that the time intervals are constant: $\Delta t_1=\Delta t_2=\Delta t_3$. In this case, the reconstruction filter can be represented by the constant time interval and the series of sampling rates: $\Delta t_1$, SR1, SR2, SR3.

While the description refers to a sampling function which applies three user-specific sampling rates to different portions of the audio signal, it should be understood that the number of user-specific sampling rates contained in the sampling function may vary. For example, the sampling function may apply a single user-specific sampling rate to the whole audio signal. In this case, the reconstruction function inserts a single user-specific sampling interval between successive samples of the non-identical copy.

Figure 3A:
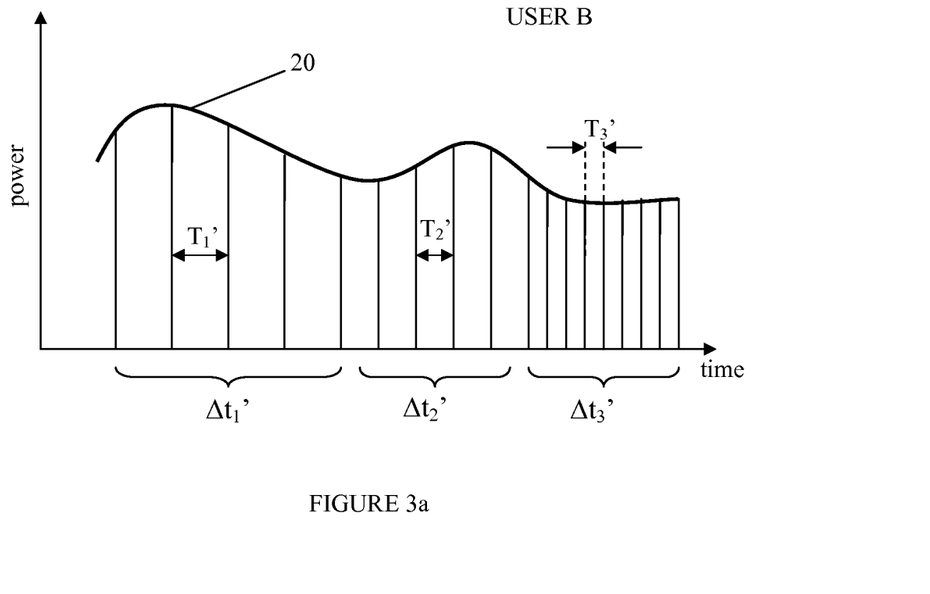
FIG. 3a illustrates the master audio signal of FIG. 2a and the imaging process for a second user, in accordance with an embodiment.
Figure 3B:
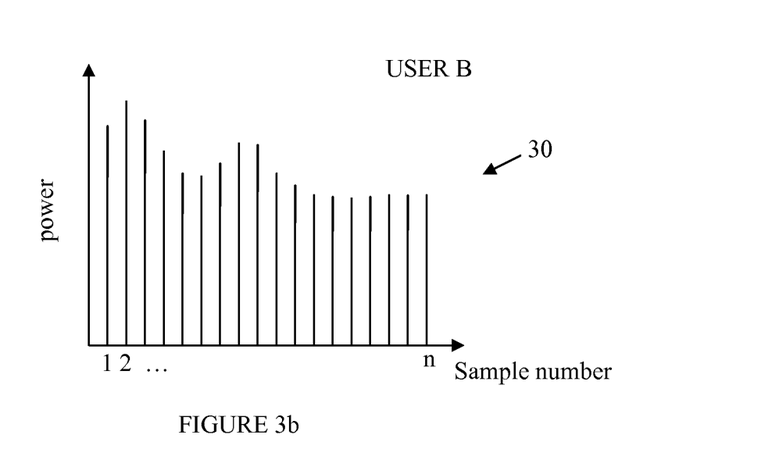
FIG. 3b illustrates the image signal resulting from the imaging process of FIG. 3a, in accordance with an embodiment.
Figure 3C:
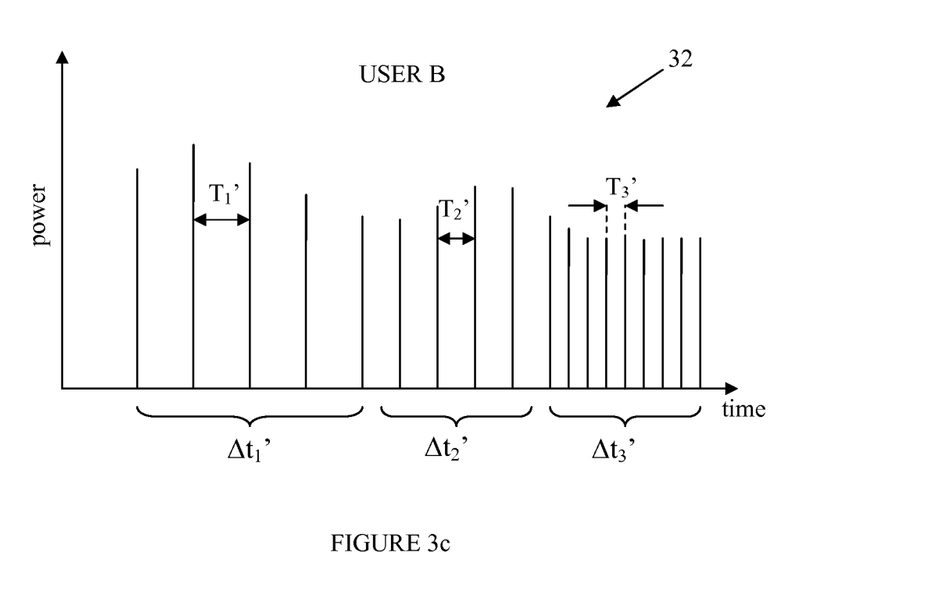
FIG. 3c illustrates the reconstruction process of the image signal of FIG. 3b, in accordance with an embodiment.

FIG. 3a illustrates the sampling process of the master song for a second user, namely user B. User B is provided with an imaging filter and a reconstruction filter which are both different from those of user A. The imaging filter for user B can be represented as: $\{\Delta t_1', SR1'\}$, $\{\Delta t_2', SR2'\}$, $\{\Delta t_3', SR3'\}$. The series of samples 30 illustrated in FIG. 3b is the image of the master song signal 20 for user B. The image 30 is then sent to user B. In order to play back the song, the image 30 is first reconstructed. This is done by applying the reconstruction filter to the received image 30 of the master song. User B reconstruction filter can be expressed as $\{T_1', n1'\}$, $\{T_2', n2'\}$, $\{T_3', n3'\}$, or $\{T_1', \Delta t_1'\}$, $\{T_2', \Delta t_2'\}$, $\{T_3', \Delta t_3'\}$. The time intervals T1', T2', and T3' correspond to the sampling rates SR1', SR2', and SR3', respectively. T1' is the time interval to be applied between two following samples of the first n1' samples of the image 30. T2' is the time interval to be applied between two following samples for the samples (n1'+1) to (n1'+n2') of the image 30, etc. Spacing the samples of the image 30 with respect to the time intervals T1', T2', and T3' results in the reconstructed signal 32 illustrated in FIG. 3c. The reconstructed signal 32 is a correct digital copy of the master song signal 20. The analog signal 26 is then obtained by converting the reconstructed signal 32 into an analog signal.

Figure 4:
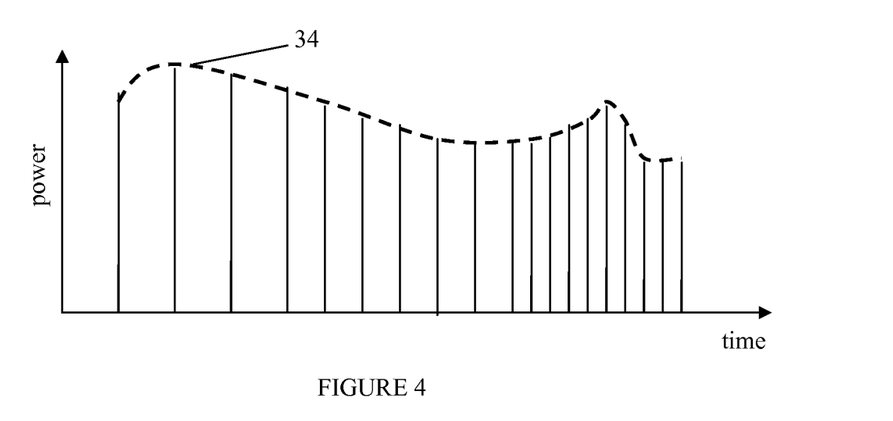
FIG. 4 illustrates an analog signal generated when the reconstruction filter of FIG. 3c is applied to the image signal 2a, in accordance with an embodiment.

While being images of the same master song signal, the received images 22 and 30 are different. If he receives the image 22, user B will not be able to properly reconstruct the master song. FIG. 4 illustrates the analog signal 34 obtained when the reconstruction filter of user B is applied to the image 22 created for user A. The analog signal 34 is different from the target analog signal 26 and the sound rendered when the analog signal 34 is played back does not correspond to the master song.

While FIGS. 2a-4 illustrate a method for providing a user with a copy of a master song, it should be understood that the method can be used for transferring a copy of other type of master data. For example, the method can be used for transferring a copy of a master video to a user. In this case, the sampling rate defines the number of frames per second taken from the video signal. The image generated by applying the sampling function to the master video signal is a series of frames having no time interrelation or being equally spaced in time. The reconstruction filter temporally reorganizes the frames by applying an adequate time interval between two successive frames in order to obtain an identical copy of the master video. The identical copy is then rendered and the resulting video substantially appears the same as the master video to the user.

In one embodiment, the master signal is a video comprising an audio signal such as a movie soundtrack. In this case, a non-identical digital copy of the video signal and/or the audio signal of the video may be generated by applying a sampling function to the video signal and/or the audio signal. The sampling function applies different sampling rates to different segments of the video signal and/or audio signal. The video signal and/or the audio signal are then reconstructed on the user side by a applying a corresponding reconstruction sampling function to the video signal and/or the audio signal.

In one embodiment, the video signal comprises at least two video signal components. In this case, a sampling function is applied to at least one of the video signal components. For example, the master video signal may be an RGB (red-green-blue) signal which comprises three video components, i.e. a red video component, a green video component, and a blue video component. A sampling function is then applied to at least one of the three video components.

Figure 5:
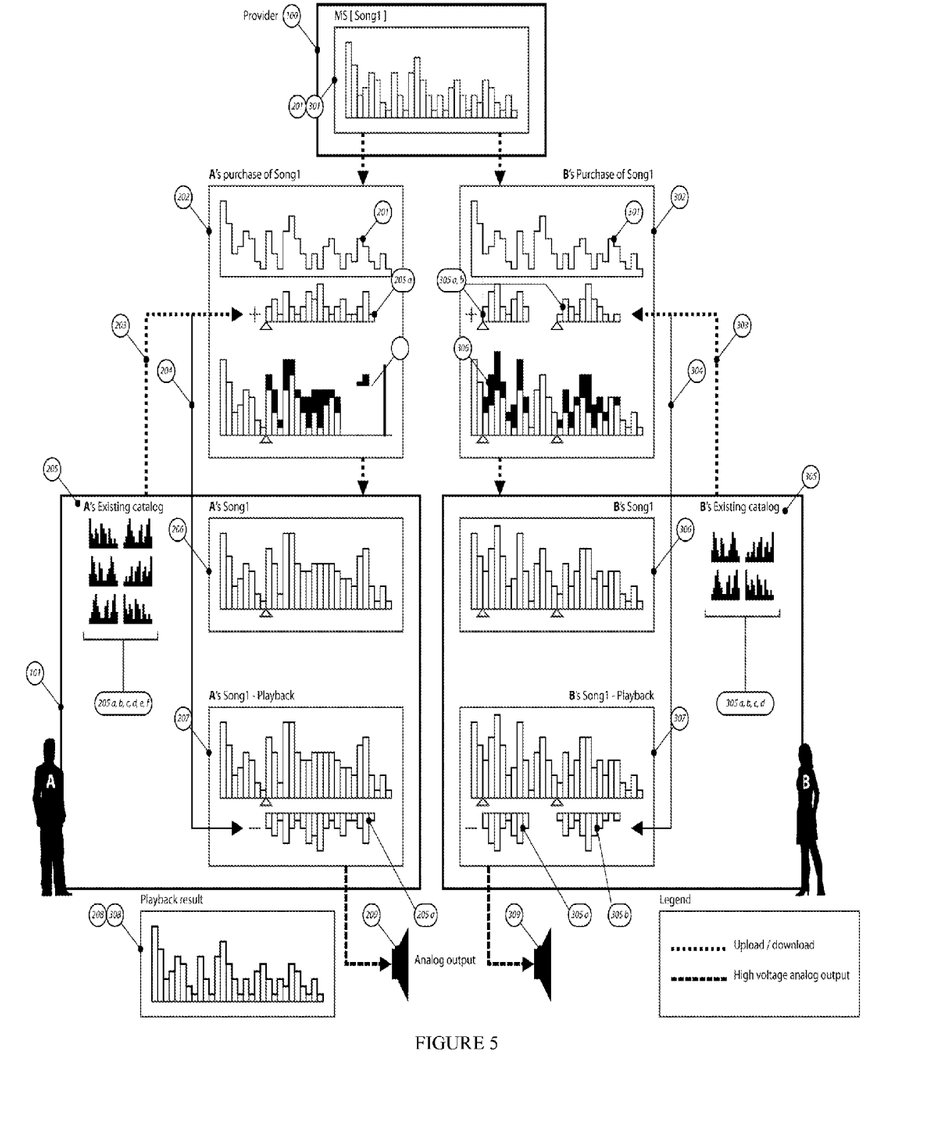
FIG. 5 illustrates a method for transmitting a copy of a master audio song comprising the modification of the amplitude of samples of the master audio signal for two users, in accordance with an embodiment.

In one embodiment where the master data comprises a master song, the step of applying an imaging filter comprises creating a digital copy of the master song signal and changing the signal of the digital copy. FIG. 5 illustrates an embodiment of the method in which information is added to a copy of a master song before being sent to a user. Users A and B want to purchase an electronic copy of a same master song 100. The first step consists in creating an identical copy 201, 301 for users A and B, respectively, and then in applying an imaging filter 202, 302, to the copies 201, 301, respectively. The imaging filters 202, 302 are user-specific so a particular imaging filter corresponds to a unique user. The imaging filters 202, 302 add a digital signal to the copies 201, 301, respectively. Concerning user A, the imaging filter 202 adds a single segment of data 205a to the digital copy 201 at a specific time location within the copy 201. The imaging filter 302 of user B adds two segments of data 305a and 305b to the digital copy 301 at specific time locations within the copy 301. The filtering process of the copies 201, 301 results in signals 206, 306, respectively. The amplitude of the samples of the digital signals 206, 306 corresponds to the sum of the amplitude of the samples of the copies 201, 301 and the amplitude of samples of the segments 205a, 305a, 305b, respectively. The digital signals 206, 306 are then sent to users A and B, respectively.

User A is provided with a database 205 of digital signal segments 205a to 205f and user B is provided with a database 305 of digital signal segments 305a to 305d. After receiving the images 206 and 306, users A and B filter these images to reconstruct the master song signal. This is done by applying a reconstruction filter to the images 206 and 306. This filtering process consists in removing the digital segment of data 205a from the image signal 206 and the digital segments of data 305a, 305b from the received image 306. The digital segments of data 205a, 305a, 305b are the segments that were previously added during the imaging process, and they are removed from the images 206, 306 at the exact same time locations where they were previously added. The amplitude of the samples of the segments 205a, and 305a, 305b is subtracted from the amplitude of the samples of images 206, 306, respectively. This results in signals 208, 308 which are identical copies of the master song 201, for both users A and B. The digital signals 208, 308 are then converted into analog signals 209, 309, respectively, in order to play back the song.

It should be understood that the imaging filter adds at least one segment of data 205a, 305a, 305b to the identical copy 201, 301 of the master song 100 and that a segment of data 205a, 305a, 305b is a signal comprising at least one sample. When a segment of data comprises more than one sample, the amplitude of the samples may be identical. Alternatively, the amplitude of the samples may vary from one sample to another in the segment of data.

In one embodiment, during the imaging process, user specific segments are added in a defined order and at defined locations within the copy of the master song. The defined order and location are information contained in the reconstruction filter so that the reconstruction filter removes the appropriate digital segments at the appropriate location within the received image signal. In this case, the imaging process always adds the same segments at the same location independently of the song master.

In another embodiment, the segments and/or the location where they are added may vary. For example, when user A purchases a first song, segment 205a may be added at a first specific location. When user A purchases a second song, segments 205 c and e may be added to the copy of the master song at other different locations within the copy. In this case, an identification of the added segments and their respective time locations is sent to user A in addition to the image 206 of the master song. For example, user A may receive the following information in addition to signal 206 representing the image of the first song: segment1, time1. In the case of the second song, user A may receive the following information: segment 3, time 2, segment 5, time 6. As users are provided with different databases of digital segments, segment 1 corresponds to segment 205a in the case of user A but corresponds to a different segment in the case of a different user. As a result, if he receives the image 206 and the respective identification information, user B would not be able to reproduce an identical copy of the master song as his segment 1 does not correspond to segment 205a.

While the above description refers to the addition of digital segments of data to particular portions of the copy 201, 301 of a master song 100, it should be understood that some or all of the samples of the copy 201, 301 may be altered in different ways during the imaging process. For example, segments of data may be subtracted during the imaging process and subsequently added during the reconstruction process. Alternatively, the amplitude of some samples may be increased while the amplitude of other samples may be reduced during the imaging process.

In one embodiment where segments of data are subtracted from the copy 201, 301 of the master song 100, the amplitude of samples in at least one segment of the copy 201, 301 is reduced while ensuring that none of the altered samples has an amplitude equal to zero in the non-identical copy of the master song. This ensures that a particular user will not be capable to retrieve the correct amplitude of the zero amplitude samples in this non-identical copy from the non-identical copy of another user. This can be achieved by selecting the segments of data to be removed from the copy 201, 301 in accordance with the copy 201, 301.

The alteration of the amplitude of samples may be continuous along the signal 201, 301 or segments of the signal 201, 301. Alternatively, the amplitude alteration may be localized at specific time locations within the signal 201, 301.

While FIG. 5 illustrates a method for transferring an identical copy of an audio signal to a user, it should be understood that the method can be used for transferring a copy of any master data. In one embodiment, the master data is a text. In this case, the segments of data to be added or removed to an identical copy of the master text comprise words.

In one embodiment, words are added to the identical copy of the master text at user-specific locations within the text in accordance with a user-specific imaging filter in order to obtain a non-identical copy of the master text. The user-specific filter comprises specific locations at which words are to be added within the text. The non-identical copy is sent to the user. An identical copy of the master text is generated by removing words in accordance with a user-specific reconstruction filter to the received non-identical copy. The reconstruction filter contains the user-specific locations at which words are to be removed from the non-identical copy.

In another embodiment, words are removed from the identical copy of the master text at specific locations within the text in order to obtain a non-identical copy of the master text. The words to be removed are selected in accordance with the master text and a user-specific library of words. The non-identical copy of the master text is sent to the user in addition to an identification of the removed words and the specific locations from which words have been removed. It should be understood that the specific locations may also be the specific locations at which the words are to be inserted in the reconstruction process. Using the identification of the removed words, the words to be inserted are retrieved from the user-specific library and inserted into the non-identical copy at the received specific locations in order to obtain an identical copy of the master text.

In another embodiment, the master data is a master video. In this case, the segments of data comprises images which are added or removed from specific frames of a digital copy of the master video. The master video may be a movie, an animation, or the like. Each user is provided with a user-specific database of images. During the imaging step, user-specific images are added or removed from specific frames of an identical digital copy of the master video in order to obtain a non-identical digital copy of the master video. The non-identical copy is then sent to the user.

In one embodiment, the images to be added/removed and the locations at which they are added/removed are fixed and predetermined. In this case, only the non-identical copy of the master video is sent to the user.

In another embodiment, the images and/or the locations at which they are added/removed may vary. In this case, an identification of the added/removed images and/or the locations at which they have been added/removed is sent to the user in addition to the non-identical copy of the master video. The location may be a time reference or a frame number.

It should be understood that a non-identical copy of a master video can be a digital copy of the master video in which some images have been removed from some frames and other images have been added to other frames.

In one embodiment, the video signal comprises at least two video signal components. In this case, images are added and/or removed from at least one of the video signal components. For example, the master video signal may be an RGB (red-green-blue) signal which comprises three video components, i.e. a red video component, a green video component, and a blue video component. Images are then added or removed from the frames of at least one of the three video components.

It should be understood that the methods illustrated above may be executed by at least two machines, each being provided with a processor, a memory and communication means. The processor of a first machine is configured to create the non-identical copy of the master data by applying an imaging filter to the master data and the processor of the second machine is configured to reconstruct an identical copy of the master data by applying a reconstruction filter to the non-identical copy of the master data. The two machines are connected together so that the non-identical image can be sent from the first machine to the second machine. The two machines may be connected together via a network such as the Internet, a LAN, a MAN, or the like.

Figure 6:
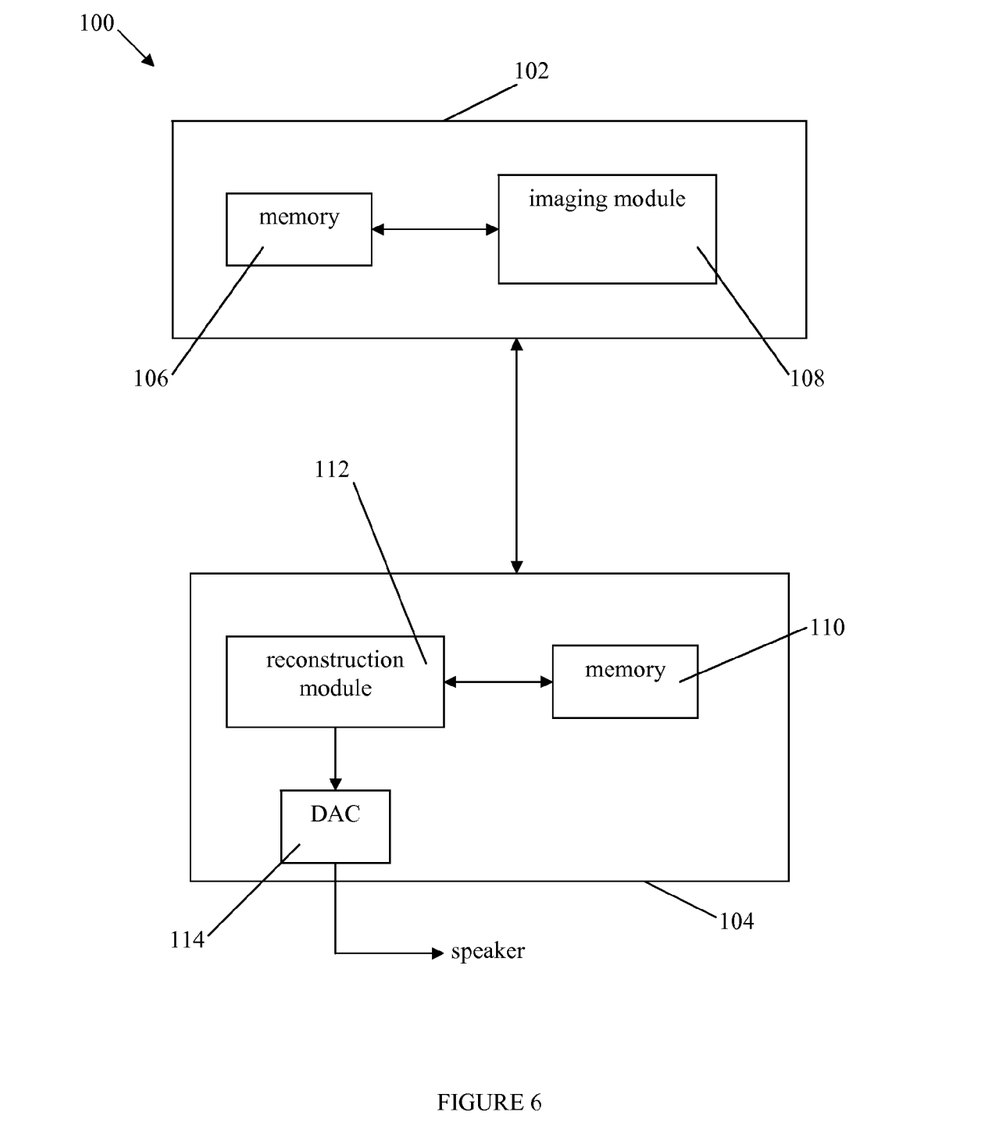
FIG. 6 is a block diagram illustrating a system for transmitting a copy of a master audio signal to a user, in accordance with an embodiment.

FIG. 6 illustrates one embodiment of a system 100 for transferring a copy of a master audio file to a user. The system 100 comprises a server 102 in communication with a digital audio player 104. The server 102 is provided with a memory 106 and an imaging module 108. The player 104 is provided with a memory 110, a reconstruction module 112 and a digital-to-analog converter (DAC) 114.

A user provided with the player 104 connects to the server 102 via a network such as the Internet in order to purchase an audio file such as a song, for example. The user selects a desired song amongst a selection of available master songs stored in the memory 106 of the server 102. Once the user has chosen the master song of which he wants a copy, the imaging module 108 accesses the memory 106 in order to create an image of the master song.

In one embodiment, the user is provided with an identification (ID) which is used to connect to the server 102. The information relative to the imaging filters for all users is stored in memory 106. The user ID is used to determine which imaging filter corresponds to the user and should be applied during the creation of the image of the master song by the imaging module 108.

In another embodiment, the user connects to the server and the server communicates with the user player 104. The server 102 accesses the player memory 110 or the reconstruction module 112, in which information relative to the reconstruction filter is stored. The server determines the imaging filter to be applied by the imaging module 108 according to the information relative to the reconstruction filter stored on the player 104.

Once the server 102 has determined which imaging filter should be used for the particular user, the imaging module 108 generates an image of the selected master song. The image is a non-identical digital copy of the master song. In one embodiment, the imaging module samples the master song with a sampling function of which the sampling rate is time-varying, in accordance with the method described above. The image of the master song outputted by the imaging module 108 comprises a series of samples having a varying amplitude and having no temporal organization. In other words, the image is a series of amplitude numbers being independent of time. In another embodiment, the imaging module 108 generates a non-identical digital copy of the master song in which the amplitude of at least some samples is different from the amplitude of the samples of an identical copy of the master song, in accordance with the method described above.

The image of the master song generated by the imaging module 108 is then sent to the player 104. In one embodiment, the received image is stored in the memory 110. When the user wants to play back the song, the reconstruction module 112 accesses the memory 110 to retrieve the corresponding image of the master song. The reconstruction module 112 then applies a reconstruction filter to the image in order to generate an identical digital copy of the master song. This identical digital copy is then converted into an analog signal by the DAC 114, which is sent to a speaker.

In an embodiment in which the imaging module 108 has sampled the master song with a time-varying sample rate, the reconstruction module 112 determines the time interval T to be inserted between two following samples of the received image according the method described above.

In one embodiment where it applies a time-varying sampling rate, the imaging module 108 is adapted to select the number and/or duration of the sampling intervals $\Delta t$ corresponding to a particular sampling rate. In this case, the imaging module 108 is adapted to send the durations of the different time intervals or the number of samples contained in each time interval $\Delta t$, in addition to the non-identical copy. The reconstruction module 112 is adapted to generate a reconstructed copy of the master song using the non-identical copy and the duration of the time intervals or the number of samples for each time interval.

In one embodiment where the received image generated by the imaging module 108 is a copy of the master song in which the amplitude of some samples has been changed, the reconstruction module 112 identifies the samples of which the amplitude has been changed and adjusts the amplitude of these samples in order to generate a digital copy representative of the master song, according to the method described above. In this case, a library of digital audio segments used for the reconstruction may be stored in the memory 110, and the imaging module 108 may access this library and generate the imaging filter according to the segments stored in the memory 110. In one embodiment, the digital audio segments are parts of songs stored in the memory 110.

In one embodiment where it is adapted to modify the amplitude of samples, the imaging module 108 is adapted to select particular segments of data to be used in the generation of the non-identical copy of the master song, and to send an identification of the selected segments of data. The reconstruction module 112 is adapted to retrieve the particular segments of data from the user-specific library or database of segments of data using the received identification.

In the same or an alternate embodiment, the imaging module 108 is adapted select the particular locations at which the segments of data are added/removed, and to send the particular locations to the reconstruction module 112. The reconstruction module 112 is adapted to generate the reconstructed copy using the received locations in order to generate a substantially identical copy of the master song.

In one embodiment of the player 104, the reconstruction module 112 is integrated into the DAC 114 and the server may identify a user using information relative to the DAC 114.

Figure 7:
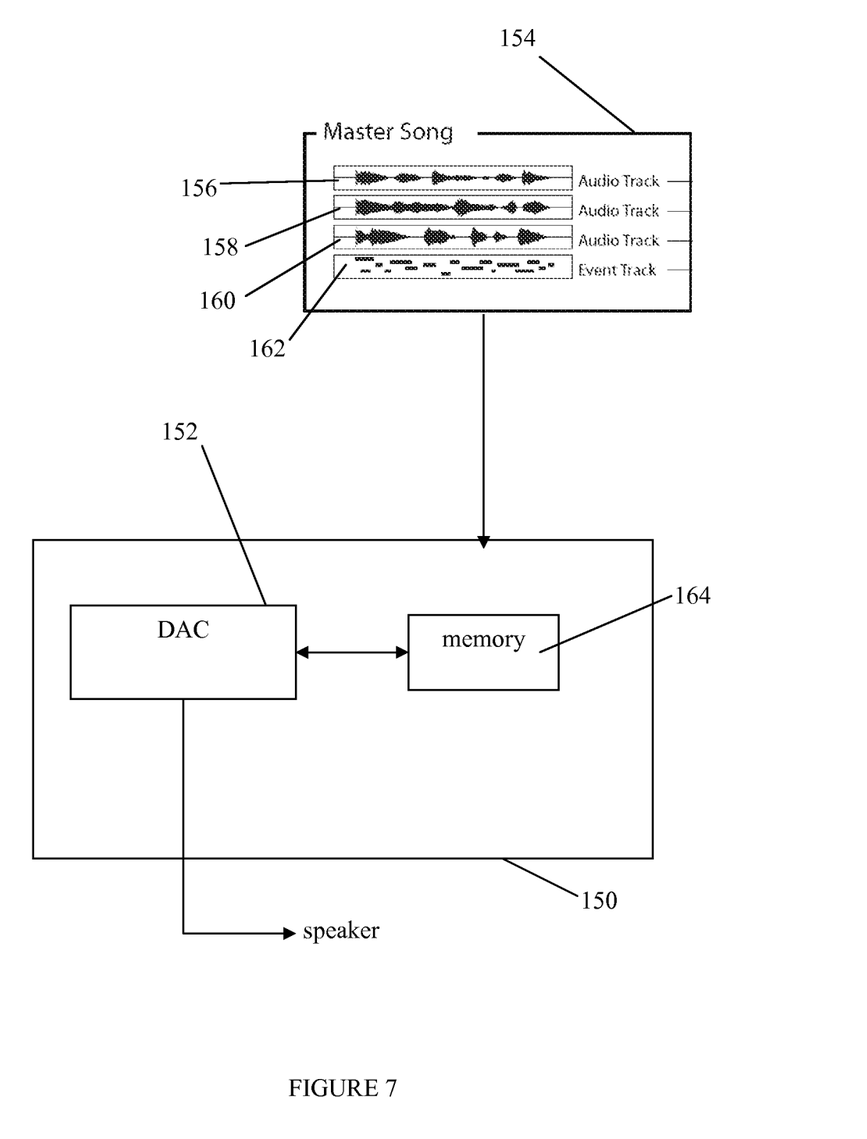
FIG. 7 is a block diagram illustrating a digital audio player, in accordance with an embodiment.

FIG. 7 illustrates one embodiment of a digital audio player 150 in which a DAC 152 performs the reconstruction step in addition to the digital-to-analog conversion. The digital audio player 150 receives an image 154 of a master audio file which comprises an image 156, 158, 160 of three master audio tracks in addition to an event track 162. Each image 156, 158, 160 is an image of a master audio track to which audio segments have been added. The event track 162 is a file which comprises the identification of the added audio segments and their temporal location, for each audio track 156, 158, 160. The digital audio player 150 receives the image 154 and stores it into a memory 164. When a user of the digital audio player 150 wants to listen to the song, the DAC 152 accesses the image 154 of the master audio file stored into the memory 164. The DAC 152 comprises an internal memory in which audio segments are stored. The DAC 152 creates an identical copy of the master audio file by applying a reconstruction filter to the image 154 The reconstruction filter is generated using the event track 162 and the audio segments stored in the internal memory. Then the DAC 152 converts the identical copy into an analog signal which is sent to a speaker. The DAC 152 can be a sound card which receives the image of the master audio file and outputs the analog signal. The reconstruction step is the last step performed before the digital-to-analog conversion. Having the steps of reconstruction and digital-to-analog conversion performed by a same module, such as a DAC or a sound card, prevents a hacker from intercepting the reconstructed digital copy of the master audio file.

The master audio file may comprise several audio channels and a copy of each audio channels is sent to the user. Each audio channel may be associated with a different pair of imaging and reconstruction filters. Alternatively, the same imaging and reconstruction filters are applied to all of the channels.

It should be understood that the player 104 can be any digital audio player such as a home stereo, a car stereo, a personal computer, a portable digital audio player, and the like.

In one embodiment, a user owns several digital audio player 104. In order to be able to play back a song on all of its players, these players are all provided with a reconstruction module which applies the same reconstruction filter. The reconstruction filter is user specific independently of the user's player on which the reconstruction filter is used.

While the description refers to a master song, it should be understood that the above illustrated methods and apparatus may be used to transfer an image of any master audio file. The image can be in any digital audio format.

Figure 8:
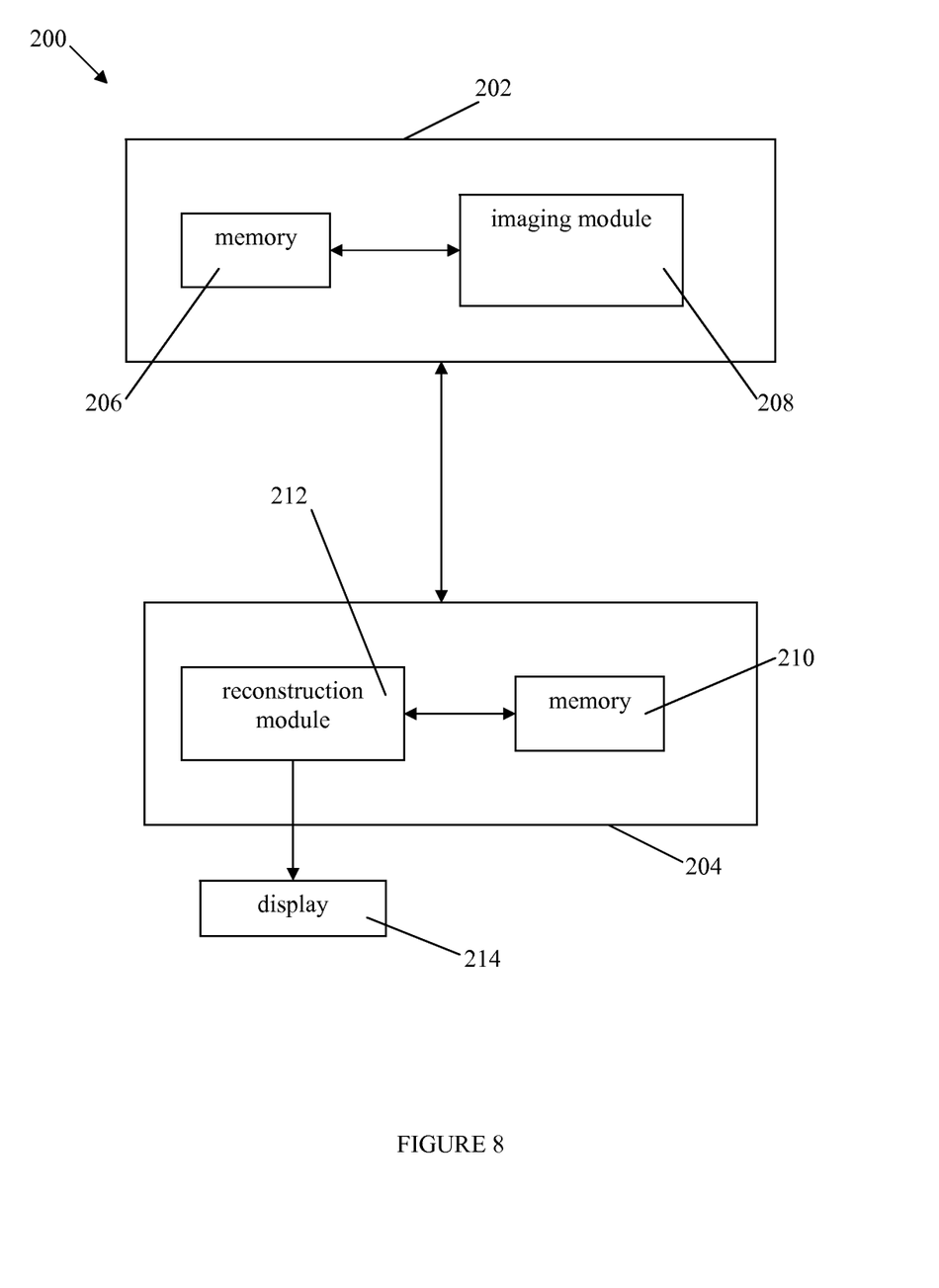
FIG. 8 is a block diagram illustrating a system for transmitting a copy of master data to be displayed, in accordance with an embodiment.

FIG. 8 illustrates one embodiment of a system 200 for transferring a copy of master data to a user. The system 200 comprises a server 202 in communication with a digital decoder 204 connected to a display 214. The server 202 is provided with a memory 206 and an imaging module 208. The digital content access and protection (CAP) device 204 is provided with a memory 210 and a reconstruction module 212.

A user provided with the CAP device 204 connects to the server 202 via a network such as the Internet in order to download a copy of master data. The user selects the desired data amongst a selection of available master data stored in the memory 206 of the server 202. Once the user has selected the master data of his choice, the imaging module 208 accesses the memory 206 in order to create a non-identical digital image of the master data. The non-identical image of the master data are sent to the CAP device 204 and stored into memory 210. The reconstruction module 212 accesses the non-identical copy from the memory 210 and generates an identical digital copy of the master data, which is sent to the display 214.

While, in FIG. 8, the display 214 is separate from the digital CAP device 204, it should be understood that the display 214 may be integral with the digital CAP device 204.

In one embodiment, the system 200 is adapted to transfer a copy of a master text from the server 202 to the CAP device 204. Master texts are stored into the memory 206 of the server. Upon selection of a particular master text by the user of the CAP device 204 and identification of the user, the imaging module 208 generates a non-identical copy of the selected master text by adding and/or removing words at user-specific locations within an identical copy of the master text, in accordance with the method described above. The imaging module 208 is adapted to send the generated non-identical copy of the selected text in addition to an identification of the inserted words.

In one embodiment where words are removed from the identical copy of the master text, the user is provided with a user-specific library of words and the imaging module 208 is adapted to remove words from the identical copy in accordance with the user-specific library. A copy of the user-specific library may be stored in the memory 206. Alternatively, the server 202 accesses the user-specific library stored in the memory 210 in order to select words to be removed from the identical copy of the master text. The imaging module is adapted to send, to the CAP device 204, an identification of the removed words, such as word 23, word 12, word 78, etc, and their corresponding location from which they have been removed. The reconstruction module 212 is adapted to retrieve the removed words from the library stored in the memory 210 using the received identification and to insert these words in the non-identical copy in order to obtain an identical copy of the master text. The identical copy is then displayed on the display 214. It should be understood that only the non-identical copies of master texts are stored in the memory 210 of the CAP device 204. Each time the user wants to read a text, the reconstruction module 212 generates an identical copy of the corresponding text and displays it on the display 214.

In one embodiment, the system 200 is adapted to transfer a video from the server 202 to the digital CAP device 204. Videos are stored into the memory 206 of the server. Upon selection of a particular master video by the user of the CAP device 204 and identification of the user, the imaging module 208 generates a digital non-identical copy of the selected video in accordance with the method described above.

In one embodiment, the imaging module 208 is adapted to apply a user-specific imaging sampling function to the master video in order to generate a non-identical copy of the master video in accordance with the method illustrated above. The non-identical copy comprises a series of frames having no time organization or being equally spaced in time. The non-identical copy is then sent to the digital CAP device 204 and stored into memory 210. Each time the user wants to display the video, the reconstruction module 212 reorganizes the frames of the received non-identical copy by applying an adequate time interval between two successive frames in accordance with a user-specific reconstruction filter stored into the memory 210. The reconstructed video is a substantially identical copy of the master video. The identical copy is then rendered and displayed to the user via the display 214.

In one embodiment, the imaging module 208 is adapted to select the particular duration of the portions of video to which a particular sampling rate is to be applied. In this case, the imaging module 208 sends the durations of the portions of the video to the CAP device 204. The duration of the different portions of the video may be represented by a time interval Δt or a number of frames.

In another embodiment, a user-specific library or database of images is stored in the memory 210 of the CAP device. The imaging module 208 is adapted to add/remove images to specific frames of an identical digital copy of the master video in accordance with the user-specific library of images in order to obtain a non-identical digital copy of the master video. A copy of the user-specific library may be stored in the memory 206 of the server 202. Alternatively, the server is adapted to access the memory 210 of the CAP device 204 in order obtain the images to be added/removed for the specific user. The non-identical copy is sent to the digital CAP device 204 and stored in the memory 210. The imaging module 208 can be adapted to add/remove images to the same frames. Alternatively, the imaging module 208 can be adapted to select particular frames to which images are to be added/removed. In this case, the imaging module 208 is adapted to send an identification of the frames of which the content has been changed in addition to the non-identical copy. The reconstruction module 212 is adapted to reconstruct a substantially identical image of the master video in accordance with the method illustrated above. Each time the user wants to display the video, the reconstruction module 212 identifies the frames of which content has been changed and retrieves the corresponding non-identical copy of the video and the corresponding images from the database of images stored in the memory 210 and generates a substantially identical copy of the master video. The identical copy is then rendered and displayed on the display 214.

In one embodiment, the display 214 is a digital display connected to the digital CAP device 204 via any digital connection such as a Digital Visual Interface (DVI) connection, a High-Definition Multimedia Interface (HDMI) connection, or the like.

In another embodiment, the display 214 is a non-digital display and the reconstructed video converted into an analog signal before being sent to the display 214. In this case, a digital-to-analog converter can be inserted between the digital CAP device 204 and the display 214. Alternatively, the reconstruction module 212 can be adapted to convert the reconstructed video into an analog signal.

In one embodiment where segments of data are removed and/or added, because the data segments used to modify the master data are not sent to the user, the possibility of hacking is reduced. A hacker who would intercept the data sent to the user would only have the non-identical copy of the data and the identification of the data segments used to modify the data. Since the data segments used to modify the master data are specific to the library of data segments of the user for which the non-identical copy is intended, the hacker cannot retrieve the appropriate data segments from another library of data segments. Because the reconstructed copy of the master data is simply played back upon request of the user and not stored in memory, the identical copy of the master data cannot be distributed to other users.

In one embodiment, the division of a copy of master data to be sampled and/or the selection of segments of data to be added/removed to the copy of the master data is chosen in accordance with properties of the master data. Alternatively, the division of the copy of the master data to be sampled and/or the selection of the segments of data to be added/removed is predetermined or performed randomly.

In one embodiment, the non-identical copy of the master data is temporarily stored into memory so that the user may have access to a reconstructed and identical copy of the master data a predetermined number times. This allows for pay-per-audition and pay-per-view systems.

In one embodiment, no encryption and subsequent decryption of the data transferred from the server to the user device are required. The non-identical copy of the master data is simply reconstructed and played back at the user's end.

In one embodiment, the non-identical copy of the master data is compressed before being transmitted to the user-end, and subsequently decompressed at the user-end before reconstruction of a substantially identical copy of the master data. For example, the server can be adapted to compress a non-identical copy of an audio or video signal and to transmit the compressed non-identical copy to a user device. The user device is adapted to decompress the received non-identical copy of the audio or video signal. The user device subsequently reconstructs a substantially identical copy of the audio or video signal after decompression of the received non-identical copy. In another embodiment, the non-identical copy of the master data is sent without any compression step at the server-end.

It should be understood that the present methods, apparatuses and systems can be used in any content access and protection systems. It should be noted that the embodiments of the invention described above are intended to be exemplary only. The present invention can be carried out as a method, can be embodied in a system and/or an apparatus. The scope of the invention is therefore intended to be limited solely by the scope of the appended claims.

We claim:

1. A method for providing a video signal to a user, comprising:
   sampling said video signal at a user specific sampling rate, thereby obtaining temporally organized sample amplitudes;
   removing a time interrelation between said temporally organized sample amplitudes, thereby obtaining sample amplitudes having no time interrelation;
   transmitting said sample amplitudes having no time interrelation to said user; and
   reconstructing said video signal by inserting a user-specific sampling interval between successive ones of said sample amplitudes, said user-specific sampling interval corresponding to said user-specific sampling rate.

2. A method as claimed in claim 1, wherein said sampling comprises splitting said video signal into at least two video signal segments and applying a different sampling rate to each one of said at least two video signal segments.

3. The method as claimed in claim 2, wherein said transmitting comprises transmitting one of a duration of each one of said at least two video signal segments and a number of samples contained in each one of said at least two video signal segments, and said inserting is performed in accordance with said one of said duration and said number of samples.

4. The method as claimed in claim 2, wherein said reconstructing comprises locally retrieving one of a duration of each one of said at least two video signal segments and a number of samples contained in each one of said at least two video signal segments.

5. A system for transferring a video signal to a user, comprising:
   a first machine comprising a first memory, a first processor and first communication means, said first processor being adapted for sampling said video signal at a user specific sampling rate in order to obtain temporally organized sample amplitudes and to remove a time interrelation between said temporally organized sample amplitudes in order to obtain sample amplitudes having no time interrelation; and
   a second machine comprising a second memory for storing a user-specific sampling interval, a second processor and second communication means and being in communication with said first machine, said second processor being adapted for reconstructing said video signal by inserting said user-specific sampling interval between successive ones of said sample amplitudes having no time interrelation, said user-specific sampling interval corresponding to said user-specific sampling rate.

6. The system as claimed in claim 5, wherein said first processor is adapted for splitting said video signal into at least two video signal segments, said user-specific sampling rate varying as a function of said at least two video signal segments, said user-specific sampling interval varying as a function of a location of said successive ones within said sample amplitudes having no time interrelation.

7. The system as claimed in claim 6, wherein said first processor is adapted for transmitting one of a duration of each one of said at least two video signal segments and a number of samples contained in each one of said at least two video signal segments, and said second processor is adapted to insert said user-specific sampling interval in accordance with said one of said duration and said number of samples.

8. The system as claimed in claim 6, wherein said second processor is adapted for locally retrieving one of a duration of each one of said at least two video signal segments and a number of samples contained in each one of said at least two video signal segments.

9. A method for downloading a video signal, comprising:
   receiving a non-identical copy of said video signal, said non-identical copy comprising sample amplitudes having no time interrelation resulting from a sampling of said video signal using a user specific sampling rate, thereby obtaining the sample amplitudes, and from a removal of the time interrelation between said sample amplitudes; and
   reconstructing said video signal by inserting a user-specific sampling interval between successive ones of said sample amplitudes, said user-specific sampling interval corresponding to said user-specific sampling rate.

10. The method as claimed in claim 9, wherein said user-specific sampling interval varies as a function of a location of said successive ones of said sample amplitudes.

11. The method as claimed in claim 10, wherein said receiving comprises receiving one of a duration of each one of said at least two video signal segments and a number of samples contained in each one of said at least two video signal segments, and said inserting is performed in accordance with said one of said duration and said number of samples.

12. The method as claimed in claim 10, wherein said reconstructing comprises locally retrieving one of a duration of each one of said at least two video signal segments and a number of samples contained in each one of said at least two video signal segments.

13. A digital video player comprising:
   communication means adapted to receive a non-identical copy of a video signal comprising sample amplitudes having no time interrelation resulting from a sampling of said video signal using a user specific sampling rate, thereby obtaining the sample amplitudes, and from a removal of the time interrelation between said sample amplitudes;
   a memory for storing a user-specific sampling interval corresponding to said user-specific sampling rate;

a reconstruction module adapted to reconstruct a digital reconstructed copy of said video signal by inserting said user-specific sampling interval between successive ones of said sample amplitudes; and a digital-to-analog converter adapted to convert said digital reconstructed copy in an analog video signal.

14. The system as claimed in claim 13, wherein said reconstruction module is adapted to insert said user-specific sampling interval, which varies as a function of a location of said successive ones of said sample amplitudes.

15. The system as claimed in claim 14, wherein said communication means is adapted for receiving one of a duration of each one of said at least two video signal segments and a number of samples contained in each one of said at least two video signal segments, and said reconstruction module is adapted to insert said user-specific sampling interval in accordance with said one of said duration and said number of samples.

16. The system as claimed in claim 14, wherein said reconstruction module is adapted for locally retrieving one of a duration of each one of said at least two video signal segments and a number of samples contained in each one of said at least two video signal segments.

\* \* \* \* \*